(12) United States Patent
Kim et al.

(10) Patent No.: US 8,399,566 B2
(45) Date of Patent: Mar. 19, 2013

(54) MODIFIED IONOMER COMPOSITION

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 317 days.

(21) Appl. No.: 12/645,345

(22) Filed: Dec. 22, 2009

(65) Prior Publication Data

US 2010/0160078 A1   Jun. 24, 2010

Related U.S. Application Data

(60) Provisional application No. 61/140,510, filed on Dec. 23, 2008, provisional application No. 61/140,513, filed on Dec. 23, 2008.

(51) Int. Cl.
- A63B 37/00 (2006.01)
- A63B 37/12 (2006.01)
- C08L 33/02 (2006.01)

(52) U.S. Cl. ........ 525/201; 525/221; 473/373; 473/374; 473/378; 473/385

(58) Field of Classification Search .................. None
See application file for complete search history.

(56) References Cited

U.S. PATENT DOCUMENTS

| | | | |
|---|---|---|---|
| 3,264,272 A | 8/1966 | Rees | |
| 3,950,260 A * | 4/1976 | Eldib | 510/434 |
| 4,404,325 A | 9/1983 | Mason et al. | |
| 4,431,193 A | 2/1984 | Nesbitt | |
| 4,884,814 A | 12/1989 | Sullivan | |
| 5,306,760 A | 4/1994 | Sullivan | |
| 5,312,857 A | 5/1994 | Sullivan | |
| 5,324,783 A | 6/1994 | Sullivan | |
| 5,789,475 A | 8/1998 | Chen | |
| 5,973,046 A | 10/1999 | Chen et al. | |
| 6,100,321 A | 8/2000 | Chen | |
| 6,329,458 B1 | 12/2001 | Takesue et al. | |
| 6,368,237 B1 | 4/2002 | Sullivan | |
| 6,416,424 B2 | 7/2002 | Sullivan | |
| 6,419,594 B1 | 7/2002 | Nesbitt et al. | |
| 6,503,156 B1 | 1/2003 | Sullivan | |
| 6,506,130 B2 | 1/2003 | Sullivan | |
| 6,562,906 B2 | 5/2003 | Chen | |
| 6,616,552 B2 | 9/2003 | Takesue et al. | |
| 6,653,382 B1 | 11/2003 | Statz et al. | |
| 6,777,472 B1 | 8/2004 | Statz et al. | |
| 6,815,480 B2 | 11/2004 | Statz et al. | |
| 6,962,951 B1 | 11/2005 | Takesue et al. | |
| 7,182,703 B2 | 2/2007 | Emerson et al. | |
| 2001/0019971 A1 | 9/2001 | Hayashi et al. | |
| 2001/0046906 A1 | 11/2001 | Rajagopalan et al. | |
| 2002/0065149 A1 | 5/2002 | Tzivanis et al. | |
| 2002/0193181 A1 | 12/2002 | Kennedy et al. | |
| 2003/0008975 A1 | 1/2003 | Takesue et al. | |
| 2003/0017888 A1 | 1/2003 | Higuchi et al. | |
| 2003/0060307 A1 | 3/2003 | Umezawa et al. | |
| 2003/0158312 A1 | 8/2003 | Chen | |
| 2004/0106474 A1 | 6/2004 | Hayashi et al. | |
| 2004/0161623 A1 | 8/2004 | Domine et al. | |
| 2004/0230006 A1 | 11/2004 | Voorheis et al. | |
| 2004/0236030 A1 | 11/2004 | Kim et al. | |
| 2005/0261424 A1 | 11/2005 | Snell et al. | |
| 2005/0288446 A1 | 12/2005 | Zieske et al. | |
| 2006/0014898 A1 | 1/2006 | Kim et al. | |
| 2006/0166762 A1 * | 7/2006 | Kim et al. | 473/374 |
| 2008/0161456 A1 * | 7/2008 | Egashira et al. | 524/174 |
| 2010/0048327 A1 * | 2/2010 | Bulpett et al. | 473/374 |

FOREIGN PATENT DOCUMENTS

| | | |
|---|---|---|
| EP | 342 244 | 11/1989 |
| JP | 59157122 | 9/1984 |
| JP | 04001231 | 1/1992 |

OTHER PUBLICATIONS

Hawley's Condensed Chemical Dictionary, 13$^{th}$ edition, pp. 206, 828, 2001.

Thain, Science and Golf IV, pp. 319-327, Jul. 2002.

Kim et al., U.S. Appl. No. 12/645,328, filed Dec. 22, 2009, entitled "Golf Ball Composition".

Kim et al., U.S. Appl. No. 12/646,688, filed Dec. 23, 2009, entitled "Golf Ball Composition".

* cited by examiner

Primary Examiner — David Buttner

(74) Attorney, Agent, or Firm — Klarquist Sparkman, LLP

(57) ABSTRACT

The present invention relates to golf balls and golf ball components comprising a blend of one or more ionomers mixed with one or more metal or ammonium salts of chelating agent. The resulting modified ionomer compositions have improved processability as shown by the increase in melt flow index (I2) as compared to the unmodified ionomer analogs while demonstrating an increase in resiliency or speed as shown by increasing COR, while maintaining or showing only a slight increase in hardness as measured by Shore D.

12 Claims, 2 Drawing Sheets

MODIFIED IONOMER COMPOSITION

CROSS REFERENCE TO RELATED APPLICATIONS

This application claims the benefit of U.S. Provisional Application No. 61/140,510 filed Dec. 23, 2008 and U.S. Provisional Application No. 61/140,513 filed Dec. 23, 2008, both of which are incorporated herein by reference in their entirety

BACKGROUND

The present invention relates to a composition suitable for sports equipment in general, and more particularly to a composition suitable for use in golf ball manufacture. In one embodiment, the novel composition of the present invention is used in the manufacture of a golf ball comprising a core, a cover layer and, optionally, one or more inner cover layers. In one preferred embodiment, a golf ball is disclosed in which the cover layer comprises the novel composition of the present invention. In another preferred embodiment, a golf ball is disclosed in which at least one intermediate layer comprises the novel composition of the present invention.

DESCRIPTION OF RELATED ART

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance especially in terms of the distance such balls travel and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results and similarly, if two additional layers are introduced between the core and outer cover layer, a so called "four-piece ball" results, and so on.

Golf ball covers were previously made from balata rubber which was favored by some players because the softness of the cover allows them to achieve spin rates sufficient to allow more precisely control of ball direction and distance, particularly on shorter approach shots. However balata-covered balls, although exhibiting high spin and soft feel, were often deficient in terms of the velocity of the ball when it leaves the club face which in turn affects the distance the ball travels.

This distance is directly related to the coefficient of restitution ("C.O.R.") of the ball. The coefficient of restitution of a one-piece golf ball is a function of the ball's composition. In a two-piece or a multi-layered golf ball, the coefficient of restitution is a function of the properties of the core, the cover and any additional layer. While there are no United States Golf Association ("USGA") limitations on the coefficient of restitution values of a golf ball, the USGA requires that the golf ball cannot exceed an initial velocity of 255 feet/second. As a result, golf ball manufacturers generally seek to maximize the coefficient of restitution of a ball without violating the velocity limitation.

Accordingly, a variety of golf ball constructions have been developed in an attempt to provide spin rates and a feel approaching those of balata covered balls, while also providing a golf ball with a higher durability and overall distance. This has resulted in the emergence of balls, which have a solid rubber core, a cover, and one, or more so called intermediate layers, as well as the application of new materials to each of these components.

A material which has been often utilized in more modern golf balls is the family of ionomer resins developed in the mid-1960's, by E.I. DuPont de Nemours and Co., and sold under the trademark SURLYN®. These ionomer resins have, to a large extent, replaced balata as a golf ball cover stock material. Preparation of such ionomers is well known, for example see U.S. Pat. No. 3,264,272 (the entire contents of which are herein incorporated by reference). Generally speaking, commercial ionomers consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer." The acid groups in the polymer are then neutralized to varying degrees by addition of a neutralizing agent in the form of a basic metal salt.

Today, there are a wide variety of commercially available ionomer resins based both on copolymers of ethylene and (meth)acrylic acid or terpolymers of ethylene and (meth)acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization.

More recent developments in the field have attempted to utilize the various types of ionomers, both singly and in blend compositions to optimize the often conflicting golf ball performance requirements of high C.O.R. and ball velocity, and cover durability, with the need for a ball to spin and have a so-called soft feel on shorter iron shots. However, the incorporation of more acid in the ionomer and/or increasing its degree of neutralization results in a material with increased polarity, and hence one which is often less compatible with other potential blend materials. Also increasing the acid content of the ionomer while increasing C.O.R. may render the ball too hard and brittle causing a loss of shot feel, control (i.e., the ability to spin the ball) and may render the cover too brittle and prone to premature failure. Finally, the incorporation of more acid in the ionomer and/or increasing its degree of neutralization typically results in an increase in melt viscosity which in turn greatly decreases the processability of these resins. Attempts to mediate these effects by adding softer terpolymeric ionomers to high acid ionomer compositions to adjust the hardness and improve the shot "feel" often result in concomitant loss of C.O.R. and hence distance.

In addition, various hard-soft ionomer blends, that is, mixtures of ionomer resins, which are significantly different in hardness and/or flexural modulus, have been evaluated for use in golf balls. For instance, U.S. Pat. No. 4,884,814 discloses the blending of various hard methacrylic based ionomer resins with similar or larger quantities of one or more "soft" ionomer methacrylic acid based ionomer resins (i.e., those ionomer resins having a hardness from about 25 to 40 as measured on the Shore D scale) to produce relatively low modulus golf ball cover compositions that are not only softer than the prior art hard ionomer covers but also exhibit a sufficient degree of durability for repetitive play. These relatively low modulus cover compositions were generally comprised of from about 25 to 70% of hard ionomer resins and from about 30 to 75% of soft ionomer resins.

Also, U.S. Pat. No. 5,324,783 discloses golf ball cover compositions comprising a blend of a relatively large amount, e.g., 70-90 wt. %, of hard ionomer resins with a relatively low amount, e.g., 10 to about 25-30 wt. %, of soft ionomers. The hard ionomers are sodium or zinc salts of a copolymer of an olefin having from 2 to 8 carbon atoms and an unsaturated monocarboxylic acid having from 3 to 8 carbon atoms. The soft ionomer is a sodium or a zinc salt of a terpolymer of an olefin having from 2 to 8 carbon atoms, methacrylic acid and an unsaturated monomer of the acrylate ester class having from 1 to 21 carbon atoms.

In order to further extend the range of properties of the ionomer resins to optimize golf ball performance, additional components have been added to them as "modifiers." For example, U.S. Pat. No. 4,104,216 (Clampitt) discloses ionomers modified with 5-50 weight percent of a long chain (un)saturated fatty acid.

Also, Japanese Patent Application No. 48/70757 discloses ionomers modified with a high level of a low molecular weight saturated or unsaturated carboxylic acid or salt or anhydride, specifically 10 to 500 parts per 100 parts by weight of ionomer. The carboxylic acid may have 1 to 100 hydrocarbon carbon chain units. Stearic, citric, oleic and glutamic acid and/or salts are exemplified.

U.S. Pat. Nos. 5,312,857 and 5,306,760 disclose cover compositions for golf ball construction comprising mixtures of ionomer resins and 25-100 parts by weight of various fatty acid salts (i.e., metal stearates, metal oleates, metal palmitates, metal pelargonates, metal laurates, etc.).

U.S. Pat. No. 6,100,321 and U.S. Patent Publication No. 2003/0158312 A1, disclose ionomer compositions, which are modified with 25 to 100 parts by weight of a fatty acid salt such as a metal stearate, for the production of golf balls with good resilience and high softness. Unlike the earlier mentioned patents, which have employed metal stearates as a filler material, these patents disclose the use of relatively low levels of a stearic acid moiety, especially calcium stearate, to modify ionomers to produce improved resilience for a given level of hardness or PGA Compression values. The stearate-modified ionomers are taught as being especially useful when the ionomer is formulated for use as a golf ball core, center, one-piece ball, or as a soft golf ball cover.

Subsequent patent applications have furthered the use of such modified ionomers in golf ball covers. For example U.S. Pat. No. 6,329,458 is directed to a golf ball cover comprising an ionomer resin and a metal "soap," e.g., calcium stearate. Finally, U.S. Pat. No. 6,616,552 discloses a golf ball including a multi-layer cover, one layer of which includes a heated mixture of an ionomer resin and a metal salt of a fatty acid, e.g., calcium stearate.

However, there remains a need for new materials with equivalent or improved properties to the ionomer resins of the prior art for use in golf ball manufacture, but which but which are not plasticized in the sense of reduced modulus and stiffness. There also remains a need for new materials, which are more compatible with other resins, and which also do not give a hard feel to the golf ball or render it brittle and prone to failure and which do not require addition of softer terpolymeric ionomers which can cause a loss of C.O.R. It would also be highly advantageous if such new materials would exhibit increased C.O.R. and modulus, and still be easily processable by having a low melt viscosity, as evinced by a high melt flow index.

The present invention relates to golf balls and golf ball components comprising a blend of one or more ionomers mixed with one or more metal or ammonium salts of a chelating agent. Illustrative chelating agents include metal and/or ammonium salts of unsaturated polycarboxylic acids as well as chelating agents including metal and/or ammonium salts having both amine and carboxylic acid functionality. In the case of a chelating agent comprising one or metal or ammonium salts of an unsaturated polycarboxylic acid, such polymers are distinct from the polymers described as ionomers in the present application.

The resulting modified ionomer compositions have improved processability as shown by the increase in melt flow index (I2) as compared to the unmodified ionomer analogs while demonstrating an increase in resiliency or speed as shown by increasing COR, while maintaining or showing only a slight increase in hardness as measured by Shore D.

SUMMARY

In one embodiment a golf ball is disclosed which includes (i) a core comprising a center, (ii) an outer cover layer; and (iii) one or more intermediate layers, where at least one of the outer cover layer or intermediate layer includes a blend composition of A) from about 75 to about 99 wt % (based on the combined weight of Components A and B) of one or more ionomers; and B) from about 1 to about 25 wt % (based on the combined weight of Components A and B) of one or more chelating agent salts; the blend composition having a flexural modulus from about 5 to about 500 kpsi, and a Shore D hardness from about 25 to about 85.

BRIEF DESCRIPTION OF DRAWINGS

Although FIGS. 1 and 2 illustrate only three- and four-piece golf ball constructions, golf balls of the present invention may comprise from 1 to at least 5 intermediate layer(s), preferably from 1 to 3 intermediate layer(s), more preferably from 1 to 2 intermediate layer(s).

DETAILED DESCRIPTION

Figure 1:
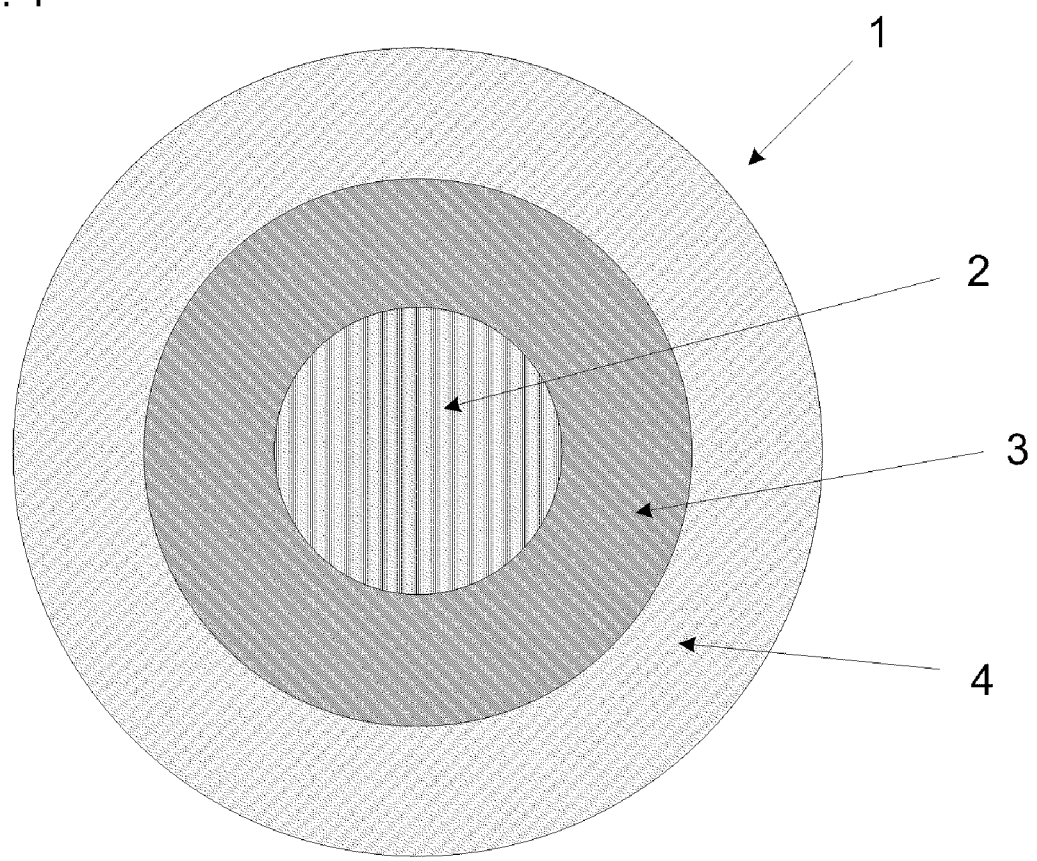
FIG. 1 illustrates a three-piece golf ball 1 comprising a solid center or core 2, an intermediate layer 3, and an outer cover layer 4.
Figure 2:
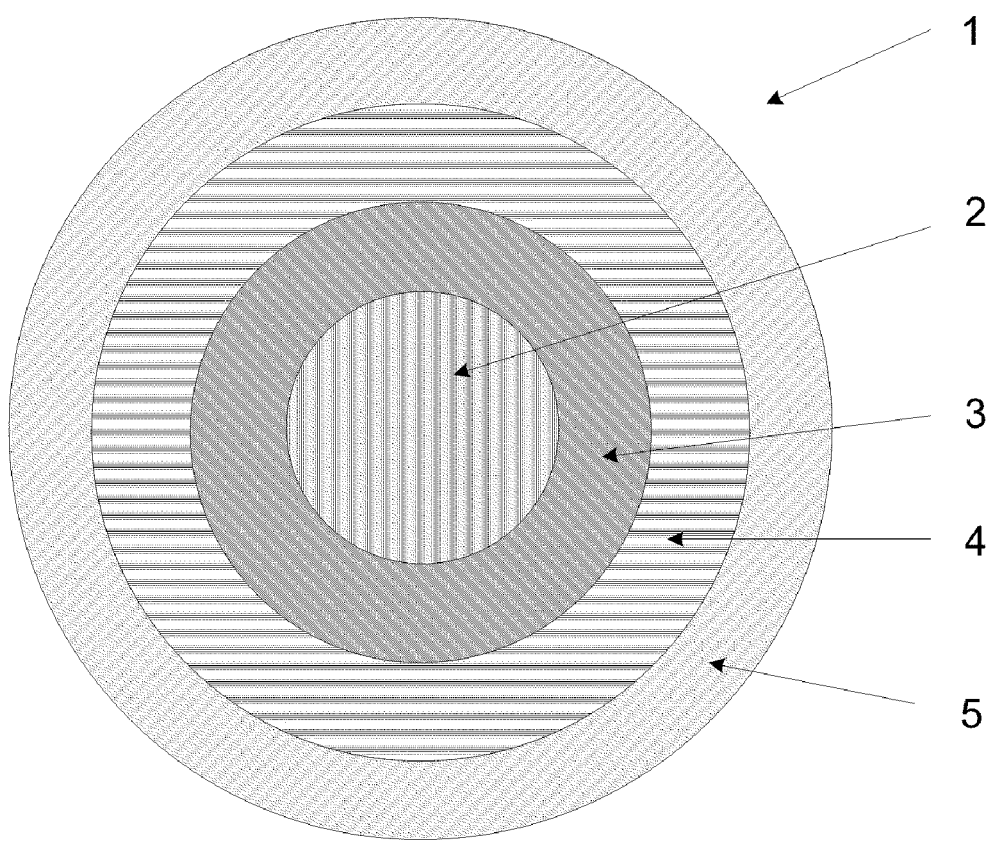
FIG. 2 illustrates a 4-piece golf ball 1 comprising a core 2, and an outer cover layer 5, an inner intermediate layer 3, and an outer intermediate layer 4.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

As used herein, the term "core" is intended to mean the elastic center of a golf ball. The core may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "intermediate layer" may be used interchangeably herein with the terms "mantle layer" or "inner cover layer" and is intended to mean any layer(s) in a golf ball disposed between the core and the outer cover layer. Should a ball have more than one intermediate layer, these may be distinguished as "inner intermediate" or "inner mantle" layers which are used interchangeably to refer to the intermediate layer nearer the core and further from the outer cover, as opposed to the "outer intermediate" or "outer mantle layer" which are also used interchangeably to refer to the intermediate layer further from the core and closer to the outer cover.

The term "prepolymer" as used herein is intended to mean any material that can be further processed to form a final polymer material of a manufactured golf ball, such as, by way of example and not limitation, a polymerized or partially polymerized material that can undergo additional processing, such as crosslinking.

A "thermoplastic" as used herein is intended to mean a material that is capable of softening or melting when heated and of hardening again when cooled. Thermoplastic polymer chains often are not cross-linked or are lightly cross-linked using a chain extender, but the term "thermoplastic" as used herein may refer to materials that initially act as thermoplastics, such as during an initial extrusion process or injection molding process, but which also may be cross-linked, such as during a compression molding step to form a final structure.

A "thermoset" as used herein is intended to mean a material that cross-links or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol, and a curing agent.

The term "thermoset polyurea" as used herein is intended to mean a material prepared by reaction of a diisocyanate with a polyamine, and a curing agent.

A "urethane prepolymer" as used herein is intended to mean the reaction product of diisocyanate and a polyol.

A "urea prepolymer" as used herein is intended to mean the reaction product of a diisocyanate and a polyamine.

The term "zwitterion" as used herein is intended to mean a form of the compound having both an amine group and carboxylic acid group, Component (B), where both are charged and where the net charge on the compound is neutral.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

As used herein, a "blend composition" can be a physical mixture of components A and B and/or a reaction product produced by a reaction between components A and B.

The term "sports equipment" refers to any item of sports equipments such as sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, golf bags, and the like.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the invention.

Intermediate or Outer Cover Layer

The outer cover and/or one or intermediate layers of the golf balls of the present invention includes an ionomer resin. One family of such resins was developed in the mid-1960's, by E.I. DuPont de Nemours and Co., and is sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha$, $\beta$-ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:
  a) a high molecular weight component having a weight average molecular weight, Mw, of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and
  b) a low molecular weight component having a weight average molecular weight, Mw, of about from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:
  a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, potassium, magnesium, calcium, barium, lead, tin, zinc or aluminum, and any and all mixtures thereof; and
  b) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;
  a) a high molecular weight component having a weight average molecular weight, Mw, of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, potassium, magnesium, calcium, barium, lead, tin, zinc or aluminum, and any and all mixtures thereof; and
  b) a low molecular weight component having a weight average molecular weight, Mw, of about from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and any and all mixtures thereof; and c) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_x COOH$, wherein the carbon atom count includes the carboxyl group (i.e. x=2-73). The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3 (CH_2)_{16}COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

Chelating Agent Salt

We have surprisingly found that the properties of the aforementioned ionomeric materials can be modified by blending with a metal or ammonium salt of a chelating agent ("CAS"). A chelating agent is typically defined as an organic or inorganic compound that will readily bind to a metal ion. Examples of the metal cation in the salts include, but are not limited to, lithium, calcium, zinc, sodium (including mono sodium, disodium, trisodium and tetrasodium), potassium, magnesium, barium, magnesium, nickel, manganese, or mixtures thereof. Examples of the ammonium cation include those having the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt.

The CAS for use in the golf balls of the present invention, include, but are not limited to, the disodium, trisodium, tetrasodium, dipotassium, tripotassium, dilithium, diammoniumbarium, calcium, cobalt, copper, dysprosium, europium, iron, indium, lanthanum, magnesium, manganese, nickel, samarium, strontium, and zinc salts of chelating agents having both amine and carboxylic acid functionality, the so called polyamino carboxylic acids also known as "complexones". The polyamino carboxylates, which have lost acidic protons, form strong complexes with metal ions by donation of electron pairs from the nitrogen and oxygen atoms to the metal ion to form multiple chelate rings. This property makes polyamino carboxylic acids useful in a wide variety of chemical, medical and environmental applications.

The polyamino carboxylic acids from which the polyamino carboxylate salts used in the present are derived include ethylenediamine-N,N,N',N'-tetraacetic acid (EDTA); trans-1,2-diaminocyclohexane-N,N,N',N'-tetraacetic acid monohydrate; N,N-bis(2-hydroxyethyl)glycine; 1,3-diamino-2-hydroxypropane-N,N,N',N'-tetraacetic acid; 1,3-diaminopropane-N,N,N',N'-tetraacetic acid; ethylenediamine-N,N'-diacetic acid; ethylenediamine-N,N'-dipropionic acid dihydrochloride; ethylenediamine-N,N'-bis(methylenephosphonic acid) hemihydrate; N-(2-hydroxyethyl)ethylenediamine-N,N',N'-triacetic acid; ethylenediamine-N,N,N',N'-tetrakis(methylenephosphonic acid); O,O'-bis(2-aminoethyl)ethyleneglycol-N,N,N',N'-tetraacetic acid; N,N-bis(2-hydroxybenzyl-ethylenediamine-N,N-diacetic acid; 1,6-hexamethylenediamine-N,N,N',N'-tetraacetic acid; N-(2-hydroxyethyl)iminodiacetic acid; iminodiacetic acid; 1,2-diaminopropane-N,N,N',N'-tetraacetic acid; nitrilotriacetic acid; nitrilotripropionic acid; the trisodium salt of nitrilotris (methylenephosphoric acid); 7,19,30-trioxa-1,4,10,13,16, 22,27,33-octaazabicyclo[11,11,11]pentatriacontane hexahydrobromide; and triethylenetetramine-N,N,N',N'',N''',N'''-hexaacetic acid.

More preferably, the polyamino carboxylic acids from which the polyamino carboxylate salts used in the present are derived include ethylenediamine-N,N,N',N'-tetraacetic acid (EDTA); the disodium, trisodium, tetrasodium, dipotassium, tripotassium, dilithium and diammonium salts of EDTA; 1,3-diamino-2-hydroxypropane-N,N,N',N'-tetraacetic acid; 1,3-diaminopropane-N,N,N',N'-tetraacetic acid; O,O'-bis(2-aminoethyl)ethyleneglycol-N,N,N',N'-tetraacetic acid; and 7,19, 30-trioxa-1,4,10,13,16,22,27,33-octaazabicyclo[11,11,11] pentatriacontane hexahydrobromide.

The disodium salt, tetrasodium salt and monocalcium disodium salt of EDTA are most preferred.

According to another embodiment, the CAS for use in the golf balls of the present invention may be the metal and/or ammonium salt of an unsaturated poly(carboxylic acid). The term "unsaturated' refers to at least one carbon to carbon unsaturated bond. The poly(carboxylic acid) salt is distinct from the polymers described as ionomers in the present application. In particular, the poly(carboxylic acid) salt is derived (i.e., produced) from an unsaturated mono- or dicarboxylic acid having 3 to 12 carbon atoms, but they are not also derived (i.e., produced) from a polymer of a mono-olefin or α-olefin, e.g., an alkene.

Unsaturated polymeric carboxylic acid salts for use as the CAS of the present invention include, but are not limited to, the metal or ammonium salts of poly(acrylic), poly(methacrylic), poly(ethacrylic), poly(α-chloroacrylic), poly(crotonic), poly(maleic), poly(fumaric), poly(itaconic) acids with the metal or ammonium salts of poly(acrylic acid) (PAA) or poly(methacrylic acid) (PMAA) being most preferred. The examples of the metal cation in the salts include, but are not limited to, lithium, calcium, zinc, sodium, potassium, magnesium, barium, magnesium, nickel, manganese, or mixtures thereof. The preferred metal salt used in this invention is sodium. Examples of the ammonium cation include those having the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt.

Additional Polymer Components

In addition to the modified ionomers of the present invention, other polymeric materials generally considered useful for making golf balls may also be included as either an additional blend component of the modified ionomer composition or as one or more of the components of the golf balls of the present invention. These include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference in its entirety), ethylene vinyl acetates, polyureas, and polysiloxanes and any and all combinations thereof.

One preferred material which may be used as a component of the cover layer or intermediate layer of the golf balls of the present invention comprises a blend of an ionomer and a block copolymer. Examples of such block copolymers include styrenic block copolymers including styrene-butadiene-styrene (SBS), styrene-ethylene-butylene-styrene, (SEBS) and styrene-ethylene/propylene-styrene (SEPS).

Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product, and in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred functionalized styrenic block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

Another preferred material for either the outer cover and/or one or intermediate layers of the golf balls of the present invention is a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al, the content of which is incorporated by reference herein in its entirety. Component A is a monomer, oligomer, prepolymer or polymer that incorporates at least five percent by weight of at least one type of an acidic functional group. Examples of such polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-acrylic acid copolymers Nucrel 599, 699, 0903, 0910, 925, 960, 2806, and 2906 ethylene-methacrylic acid copolymers, sold by DuPont Also included are the bimodal ethylene/carboxylic acid polymers as described in U.S. Pat. No. 6,562,906, the contents of which are incorporated herein by reference. These polymers comprise ethylene/α, β-ethylenically unsaturated $C_{3-8}$ carboxylic acid high copolymers, particularly ethylene (meth) acrylic acid copolymers and ethylene, alkyl (meth)acrylate, (meth)acrylic acid terpolymers, having molecular weights of about 80,000 to about 500,000 which are melt blended with ethylene/α, β-ethylenically unsaturated $C_{3-8}$ carboxylic acid copolymers, particularly ethylene/(meth)acrylic acid copolymers having molecular weights of about 2,000 to about 30,000.

Component B can be any monomer, oligomer, or polymer, preferably having a lower weight percentage of anionic functional groups than that present in Component A in the weight ranges discussed above, and most preferably free of such functional groups. Examples of materials for use as Component B include block copolymers such as styrenic block copolymers including styrene-butadiene-styrene (SBS), styrene-ethyl ene-butylene-styrene, (SEBS) and styrene-ethylene/propylene-styrene (SEPS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. Commercial examples SEPTON marketed by Kuraray Company of Kurashiki, Japan; TOPRENE by Kumho Petrochemical Co., Ltd and KRATON marketed by Kraton Polymers.

Component C is a base capable of neutralizing the acidic functional group of Component A and is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

Another preferred material which may be used as a component of the cover layer or intermediate layer of the golf balls of the present invention are the polyalkenamers which may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference. Examples of suitable polyalkenamer rubbers are polybutenamer rubber, polypentenamer rubber, polyhexenamer rubber, polyheptenamer rubber, polyoctenamer rubber, polynonenamer rubber, polydecenamer rubber polyundecenamer rubber, polydodecenamer rubber, polytridecenamer rubber. For further details concerning polyalkenamer rubber, see Rubber Chem. & Tech., Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubbers used in the present disclosure exhibit excellent melt processability above their sharp melting temperatures and exhibit high miscibility with various rubber additives as a major component without deterioration of crystallinity which in turn facilitates injection molding. Thus, unlike synthetic polybutadiene rubbers typically used in golf ball core preparation, injection molded parts of polyalkenamer-based compounds can be prepared which, in addition, can also be partially or fully crosslinked at elevated temperature. The crosslinked polyalkenamer compounds are highly elastic, and their mechanical and physical properties can be easily modified by adjusting the formulation.

The polyalkenamer composition surprisingly exhibits superior characteristics over a broad spectrum of properties that relate to the effectiveness of a composition for use in the SCR of the golf balls of the present invention. For example, the composition exhibits superior impact durability and Coefficient of Restitution (COR) in a pre-determined hardness range (e.g., a hardness Shore D of from about 15 to about 85, preferably from about 40 to about 80, and more preferably from about 40 to about 75. More particularly, the compositions disclosed herein exhibit excellent hardness adjustment without significantly compromising COR or processability.

The polyalkenamer rubbers may also be blended within other polymers and an especially preferred blend is that of a polyalkenamer and a polyamide. A more complete description of the polyalkenamer rubbers are disclosed in U.S. Pat. No. 7,528,196 and copending U.S. application Ser. No. 12/415,522, filed on Mar. 31, 2009, both in the name of Hyun Kim et al., the entire contents of both of which are hereby incorporated by reference.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer has a trans content of approximately 80%, however, compounds having other ratios of the cis- and trans-isomeric forms of the polyalkenamer can also be obtained by blending available products for use in making the composition.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5 to about 70, preferably from about 6 to about 50, more preferably from about from 6.5 to about 50%, even more preferably from about from 7 to about 45%.

More preferably, the polyalkenamer rubber is a polymer prepared by polymerization of cyclooctene to form a trans-polyoctenamer rubber as a mixture of linear and cyclic macromolecules.

Another preferred material for the outer cover and/or one or intermediate layers of the golf balls of the present invention is a blend of a homopolyamide or copolyamide modified and a polymer including a grafted maleic anhydride group.

Another preferred material which may be used as a component of the cover layer or intermediate layer of the golf balls of the present invention is the family of polyurethanes or polyureas which are typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

In addition to discrete thermoplastic or thermoset materials, it also is possible to modify a thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that are prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5- isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols.

Any polyamine available to one of ordinary skill in the polyurethane art is suitable for use according to the invention. Polyamines suitable for use in the compositions of the present invention include, but are not limited to, amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene)ether diamines, triethyleneglycoldiamines, propylene oxide-based triamines, trimethylolpropane-based triamines, glycerin-based triamines, and mixtures thereof.

The diisocyanate and polyol or polyamine components may be combined to form a prepolymer prior to reaction with a chain extender or curing agent. Any such prepolymer combination is suitable for use in the present invention.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4''-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl)phenol.

Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate;

polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

Also included as a curing agent for use in the polyurethane or polyurea compositions used in the present invention are the family of dicyandiamides as described in copending application Ser. No. 11/809,432 filed on May 31, 2007 by Kim et al., the entire contents of which are hereby incorporated by reference The modified ionomer composition used to prepare the golf ball cover and/or at least one intermediate layer can be prepared directly by mixing the individual blend components or in-situ by combining the base ionomer precursors, any additional blend components and the CAS in any and all combinations including;
1) Mixing the ionomer composition with the CAS after which optionally additional non-ionomeric polymer components may be added;
2) Mixing the ionomer composition with optionally any additional non-ionomeric polymer components and then blending this mixture with the CAS;
3) Mixing the ionomer precursor of an ethylene/α, β-ethylenically unsaturated $C_{3-8}$ carboxylic acid copolymer and/or one or more ethylene, alkyl (meth)acrylate, (meth)acrylic acid terpolymer with optionally additional non-ionomeric polymer components which mixture can then be mixed with the CAS either prior to, or with, subsequent neutralization of the ionomer precursor by for example acetate, oxide or hydroxide salts of lithium, calcium, zinc, sodium, potassium, magnesium, magnesium, nickel, manganese, or mixtures thereof.

Core Composition

The cores of the golf balls of the present invention may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}(100°$ C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}(100°$ C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C. As readily appreciated by one skilled in the art, blends of polybutadiene rubbers may also be utilized in the golf balls of the present invention, such blends may be prepared with any mixture of rare earth-based catalysts, nickel-based catalysts, or cobalt-based catalysts derived materials, and from materials having different molecular weights, molecular weight distributions and Mooney viscosity.

The cores of the golf balls of the present invention may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan.

The cores of the golf balls of the present invention may also include the polyalkenamer rubbers as previously described herein and disclosed in copending U.S. application Ser. No. 11/335,070, filed on Jan. 18, 2006, in the name of Hyun Kim et al., the entire contents of which are hereby incorporated by reference.

When synthetic rubbers such as the aforementioned polybutadienes or polyalkenamers and their blends are used in the golf balls of the present invention they may contain further materials typically often used in rubber formulations including crosslinking agents, co-crosslinking agents, peptizers and accelerators.

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 parts to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α, β-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The core compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in copending U.S. Application No. 60/752, 475 filed on Dec. 20, 2005 in the name of Hyun Kim et al, the entire contents of which are herein incorporated by reference. A most preferred example is 2,3,5,6-tetrachloro-4-pyridinethiol (TCPT).

The peptizer, if employed in the golf balls of the present invention, is present in an amount up to about 10, from about 0.01 to about 10, preferably of from about 0.10 to about 7, more preferably of from about 0.15 to about 5 parts by weight per 100 parts by weight of the synthetic rubber component.

The core compositions can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in The Vanderbilt Rubber Handbook: 13$^{th}$ Edition (1990, R.T. Vanderbilt Co.), pp. 296-330, in Encyclopedia of Polymer Science and Technology, Vol. 12 (1970, John Wiley & Sons), pp. 258-259, and in Rubber Technology Handbook (1980, Hanser/Gardner Publications), pp. 234-236. Preferred accelerators include 2-mercaptobenzothiazole (MBT) and its salts. The synthetic rubber composition can further incorporate from about 0.1 part to about 10 parts by weight of the accelerator per 100 parts by weight of the rubber. More preferably, the ball composition can further incorporate from about 0.2 part to about 5 parts, and most preferably from about 0.5 part to about 1.5 parts, by weight of the accelerator per 100 parts by weight of the rubber.

Fillers

The various polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred aspect the filler comprises a continuous or non-continuous fiber. In another preferred aspect the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Nanofillers when added into a matrix polymer, such as the polyalkenamer rubber, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating up to about 20%, or from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385, 776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

The nanofiller material is added in an amount up to about 20 wt %, from about 0.1% to about 20%, preferably from about 0.1% to about 15%, and most preferably from about 0.1% to about 10% by weight (based on the final weight of the polymer matrix material) of nanofiller reacted into and substantially dispersed through intercalation or exfoliation into the structure of the polymer matrix.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the various polymer compositions used to prepare the golf balls of the present invention includes compounds having the general formula:

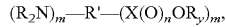

$(R_2N)_m$—R'—$(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference.

Preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoic acid, 12-aminododecanoic acid, epsilon-caprolactam; omega-caprolactam, and any and all combinations thereof.

In an especially preferred aspect, a nanofiller additive component in the golf ball of the present invention is surface modified with a compatibilizing agent comprising the earlier described compounds having the general formula:

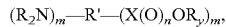

$(R_2N)_m$—R'—$(X(O)_nOR_y)_m$,

A most preferred aspect would be a filler comprising a nanofiller clay material surface modified with an amino acid including 12-aminododecanoic acid. Such fillers are available from Nanonocor Co. under the tradename Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

The modified ionomer composition used as a component of the golf balls of the present invention may also be further modified by addition of a monomeric aliphatic and/or aromatic amide as described in copending application Ser. No. 11/592,109 filed on Nov. 1, 2006 in the name of Hyun Kim et al., the entire contents of which are hereby incorporated by reference.

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, antioxidants, colorants, dispersants, mold releasing agents, processing aids, fillers, and any and all combinations thereof. Although not required, UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN.

The methods of making the presently described modified ionomer compositions used in the golf balls can incorporate a number of known processes. The ionomer and CAS can be mixed together using dry blending equipment, such as a tumbler mixer, V-blender, or ribbon blender, or by using a mill, internal mixer, extruder or combinations of these, with or without application of thermal energy to produce melting or chemical reaction. For example, the CAS can be premixed with the ionomer to form a concentrate having a high concentration of CAS. Then, this concentrate can be introduced into the base ionomer using dry blending or melt mixing. The CAS also can be added to a color concentrate, which is then added to the composition to impart a white color to golf ball. Any combination of the above-mentioned mixing processes can be used.

Also described herein are methods for making golf ball covers and intermediate layers incorporating the above-described modified ionomer composition.

The various formulations for the intermediate layer and/or cover layer may be produced using a twin-screw extruder or may be blended manually or mechanically prior to the addition to the injection molder feed hopper. Finished golf balls may be prepared by initially positioning the solid, preformed core in an injection-molding cavity, followed by uniform injection of the intermediate layer and/or cover layer composition sequentially over the core. The cover formulations can be injection molded around the cores to produce golf balls of the required diameter.

Alternatively, the cover layers may also be formed around the core by first forming half shells by injection molding followed by compression molding the half shells about the core to form the final ball.

Covers may also be formed around the cores using compression molding. Cover materials for compression molding may also be extruded or blended resins or castable resins such as polyurethane.

Typically the golf ball core is made by mixing together the unsaturated polymer, cross-linking agents, and other additives with or without melting them. Dry blending equipment, such as a tumbler mixer, V blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill, to form slugs of approximately 30-40 g, and then compression-mold in a single step at a temperature between 150 to 180° C., for a time duration between 5 and 12 minutes.

The various core components may also be combined to form a golf ball by an injection molding process, which is also well known to one of ordinary skill in the art. The curing time depends on the various materials selected, and those of ordinary skill in the art will be readily able to adjust the curing time upward or downward based on the particular materials used and the discussion herein.

The golf ball of the present invention may comprise from 0 to 5, preferably from 0 to 3, more preferably from 1 to 3, most preferably 1 to 2 intermediate layer(s).

In one preferred aspect, at least one of the intermediate layers comprises the novel blend compositions described herein.

In one preferred aspect, the golf ball is a three-piece ball with the modified ionomer composition of the present invention, used in the intermediate or mantle layer. In a more preferred aspect the three-piece ball has the modified ionomer composition of the present invention used in the intermediate or mantle layer and a cover comprising a thermoplastic elastomer, a thermoplastic or thermoset polyurethane, an ionomer, or the reaction product of an ethylene/(meth)acrylic acid copolymers and/or an ethylene/(meth)acrylic acid/alkyl (meth)acrylate terpolymers with a styrenic block copolymer and a metal hydroxide, metal oxide, metal stearate, metal carbonate, or metal acetate.

In another preferred aspect, the golf ball is a four-piece ball with the modified ionomer composition of the present invention, used in one of the two intermediate or mantle layers in the golf ball. In a more preferred aspect the four-piece ball has the modified ionomer composition of the present invention used in the inner mantle or intermediate layer. In an especially preferred aspect, the four-piece ball has the modified ionomer composition of the present invention, used in the inner mantle or intermediate layer and a cover comprising a thermoplastic elastomer such as a thermoplastic or thermoset polyurethane, an ionomer, or the reaction product of an ethylene/(meth)acrylic acid copolymers and/or an ethylene/(meth)acrylic acid/alkyl (meth)acrylate terpolymers with a styrenic block copolymer and a metal hydroxide, metal oxide, metal stearate, metal carbonate, or metal acetate.

In another preferred aspect, the golf ball is a four-piece ball with the modified ionomer composition of the present invention used in one of the two intermediate or mantle layers in the golf ball. In a more preferred aspect the four-piece ball has the modified ionomer composition of the present invention, used in the outer mantle or outer intermediate layer. In an especially preferred aspect, the four-piece ball has the modified ionomer composition of the present invention used in the outer mantle or outer intermediate layer and a cover comprising a thermoplastic elastomer such as a thermoplastic or thermoset polyurethane, an ionomer, or the reaction product of an ethylene/(meth)acrylic acid copolymers and/or an ethylene/(meth)acrylic acid/alkyl (meth)acrylate terpolymers with a styrenic block copolymer and a metal hydroxide, metal oxide, metal stearate, metal carbonate, or metal acetate.

The chelating agent salt used in the modified ionomer composition of the present invention is present in an amount of from about 1 to about 25, preferably about 2 to about 20, more preferably from about 3 to about 15 wt % (based on the total weight of modified ionomer composition).

The ionomer used in the modified ionomer composition of the present invention is present in an amount of from about 75 to about 99, preferably about 80 to about 98, more preferably from about 85 to about 97 wt % (based on the total weight of modified ionomer composition).

The modified ionomer composition of the present invention has a material Shore D hardness of from about 25 to about 85, preferably from about 30 to about 80, more preferably from about 35 to about 75.

The modified ionomer composition of the present invention has a flexural modulus from about 5 to about 500, preferably from about 15 to about 400, more preferably from about 20 to about 300, still more preferably from about 25 to about 200, and most preferably from about 30 to about 150 kpsi.

Spheres of the modified ionomer composition of the present invention may be made by injection molding for the purposes of evaluating their property performance. The modified ionomer composition used in the present invention when formed into such spheres has a PGA compression of from about 30 to about 200, preferably from about 35 to about 185, more preferably from about 45 to about 180; and a COR greater than about 0.500, preferably greater than 0.600, more preferably greater than about 0.650, and most preferably greater than 0.700 at 125 ft/sec inbound velocity.

The core of the balls may have a diameter of from about 0.5 to about 1.62, preferably from about 0.7 to about 1.60, more preferably from about 1 to about 1.58, yet more preferably from about 1.20 to about 1.54, and most preferably from about 1.40 to about 1.50 in.

The core of the balls also may have a PGA compression of less than about 140, preferably less than about 120, more preferably less than about 100, yet more preferably less than about 90, and most preferably less than about 80.

The various core layers (including the center) may each exhibit a different hardness. The difference between the center hardness and that of the next adjacent layer, as well as the difference in hardness between the various core layers may be greater than 2, preferably greater than 5, most preferably greater than 10 units of Shore D.

In one preferred aspect, the hardness of the center and each sequential layer increases progressively outwards from the center to outer core layer.

In another preferred aspect, the hardness of the center and each sequential layer decreases progressively inwards from the outer core layer to the center.

The one or more intermediate layers of the golf balls may have a thickness of about 0.01 to about 0.50 or about 0.01 to about 0.20, preferably from about 0.02 to about 0.30 or from about 0.02 to about 0.15, more preferably from about 0.03 to about 0.20 or from about 0.03 to about 0.10, and most preferably from about 0.03 to about 0.10 or about 0.03 to about 0.06 in.

The one or more intermediate layers of the golf balls also may have a hardness as measured on the ball of greater than about 25, preferably greater than about 30, more preferably greater than about 40, and most preferably greater than about 50, Shore D units.

The cover layer of the balls may have a thickness of about 0.01 to about 0.10, preferably from about 0.02 to about 0.08, more preferably from about 0.03 to about 0.06 in.

The cover layer the balls may have a Shore D hardness as measured on the ball from about 35 to about 70, preferably from about 45 to about 70 or about 50 to about 70, more preferably from about 47 to about 68 or about 45 to about 70, and most preferably from about 50 to about 65.

The COR of the golf balls may be greater than about 0.760, preferably greater than about 0.780, more preferably greater than 0.790, most preferably greater than 0.795, and especially greater than 0.800 at 125 ft/sec inbound velocity.

EXAMPLES

Examples of the invention are given below by way of illustration and not by way of limitation.

The properties of C.O.R., Shore D hardness (measured on both the material and on the resulting spheres) were conducted using the test methods as defined below.

Core or ball diameter was determined by using standard linear calipers or size gauge.

Compression is measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

Thus, a Riehle compression of 100 would be the same as an Atti compression of 60.

Initial velocity of a golf ball after impact with a golf club is governed by the United States Golf Association ("USGA"). The USGA requires that a regulation golf ball can have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a perfectly or completely elastic collision and 0 being equivalent to a perfectly plastic or completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec (for the tests used herein the velocity was 125 ft/sec). As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Shore D hardness was measured in accordance with ASTM Test D2240.

Melt flow index (I2) was measured in accordance with ASTM D-1238, Condition 230° C./2.16 kg.

Example 1

A blend of an ionomer (comprising a zinc salt of the polymer of ethylene and acrylic acid with a final acid content of 15 wt % and a Shore D hardness of 60 D) and the tetra sodium salt of ethylene diamine tetraacetic acid (sodium EDTA) was prepared by extrusion as summarized in Table 1. Spheres having a diameter of 1.52 in were then prepared from the resulting resin by standard injection molding techniques. For Comparative Example 1 a sphere was made under identical conditions from just the ionomer material and no added sodium EDTA. Table 1 represents the physical properties of samples of the modified ionomer composition of the present invention.

TABLE 1

Sphere Physicals Tested on Ionomer Modified With Na Salt of EDTA.

| | Comp Ex 1 | Ex 1 |
| --- | --- | --- |
| Ionomer | 100 | 100 |
| Na salt of EDTA (pph) | | 5 |

TABLE 1-continued

Sphere Physicals Tested on Ionomer
Modified With Na Salt of EDTA.

|  | Comp Ex 1 | Ex 1 |
|---|---|---|
| Sphere physicals |  |  |
| MFI | 11 | 18 |
| Shore D | 60.1 | 63.9 |
| COR (125 ft/sec) | 0.625 | 0.665 |

The data in Table 1 shows that addition of the sodium EDTA to the ionomer results in an increase in processability as shown by the increase in melt flow index (I2) and an increase in resiliency or speed as shown by increasing COR while maintaining or showing only a slight increase in hardness as measured by Shore D.

Examples 2-4

A series of blends of an ionomer (comprising a zinc salt of the polymer of ethylene and acrylic acid with a final acid content of 15 wt % and a Shore D hardness of 60 D) and varying amounts of sodium poly(acrylic acid) were prepared by extrusion as summarized in Table 2. Spheres having a diameter of 1.52 in were then prepared from the resulting resin by standard injection molding techniques. For Comparative Example 2, a sphere was made under identical conditions from just the ionomer material and no added sodium poly(acrylic acid). Table 2 represents the physical properties of samples of the modified ionomer composition of the present invention.

TABLE 2

Sphere Physicals Tested on Ionomer
Modified With Na Salt of PAA.

|  | Comp Ex 2 | Example 2 | Example 3 | Example 4 |
|---|---|---|---|---|
| Ionomer[a] | 100 | 100 | 100 | 100 |
| Na salt of poly(acrylic acid)[b] |  | 3 | 5 | 10 |
| Sphere physicals |  |  |  |  |
| MFI | 9.5 | 14.2 | 15.7 | 15 |
| Shore D | 62.2 | 61.2 | 63.3 | 65.2 |
| COR (125 ft/sec) | 0.677 | 0.691 | 0.711 | 0.731 |

[a]Zinc salt of a polymer of ethylene and acrylic acid with a final acid content of 15 wt % and a Shore D hardness of 60D
[b]The sodium poly(acrylic acid) is commercially available from Aldrich The data in Table 2 shows that addition of the sodium salt of poly(acrylic acid) results in an increase in processability as shown by the increase in melt flow index (I2) and an increase in resiliency or speed as shown by increasing COR, while maintaining or showing only a slight increase in hardness as measured by Shore D.

The invention claimed is:
1. A golf ball comprising;
   1) a core comprising a center,
   2) an outer cover layer; and
   3) one or more intermediate layers,
wherein at least one of the intermediate layers comprises a blend composition of;
   (A) of from about 75 to about 99 wt % (based on the combined weight of Components A and B) of one or more ionomers; and
   (B) of from about 1 to about 25 wt % (based on the combined weight of Components A and B) of a sodium salt of poly(meth)acrylic acid; and
wherein said blend composition has a flexural modulus of from about 5 to about 500 kpsi, and a Shore D hardness of from about 25 to about 85;
   at least one of the intermediate layers comprises a polyalkenamer rubber selected from the group consisting of polybutenamer rubber, polypentenamer rubber, polyhexenamer rubber, polyheptenamer rubber, polyoctenamer rubber, polynonenamer rubber, polydecenamer rubber polyundecenamer rubber, polydodecenamer rubber, polytridecenamer rubber and any and all combinations thereof; and
   the outer cover layer comprises a polymer selected from the group consisting of thermoset polyurethanes, thermoset polyureas, thermoplastic polyurethanes, thermoplastic polyureas, ionomers, styrenic block copolymers, ethylene/(meth)acrylic acid copolymers, or ethylene/(meth)acrylic acid/alkyl(meth)acrylate terpolymers, a unimodal ionomer, a bimodal ionomer, a modified unimodal ionomer, a modified bimodal ionomer and any and all combinations thereof.

2. The golf ball of claim 1 wherein in said blend composition;
   A) Component A is present in an amount of from about 80 to about 98 wt % (based on the combined weight of Components A and B) one or more ionomers; and
   B) Component B is present in an amount of from about 2 to about 20 wt % (based on the combined weight of Components A and B); and
wherein said blend composition has a flexural modulus of from about 15 to about 400 kpsi, and a Shore D hardness of from about 30 to about 80.

3. The golf ball of claim 1 wherein in said blend composition;
   A) Component A is present in an amount of from about 85 to about 97 wt % (based on the combined weight of Components A and B) one or more ionomers and
   B) Component B is present in an amount of from about 3 to about 15 wt % (based on the combined weight of Components A and B); and
wherein the blend composition has a flexural modulus of from about 200 to about 300 kpsi., and a Shore D hardness of from about 35 to about 75.

4. The golf ball of claim 1, wherein said outer cover layer comprises a blend composition comprising one or more ionomers blended with;
   A) one or more triblock copolymers; or
   B) one or more hydrogenation products of the triblock copolymers; or
   C) one or more hydrogenated diene block copolymers; and
wherein each triblock copolymer has
   (i) a first polymer block comprising an aromatic vinyl compound,
   (ii) a second polymer block comprising a conjugated diene compound, and wherein each hydrogenated diene block copolymer has a polystyrene-reduced number-average molecular weight of from 50,000 to 600,000, and is a hydrogenation product of;
   (i) an A-B block copolymer, in which A is an alkenyl aromatic compound polymer block, and B is either
      (1) a conjugated diene homopolymer block, wherein the vinyl content of the conjugated diene portion is more than 60%, or (2) an alkenyl aromatic compound-conjugated diene random copolymer block wherein the vinyl content of the conjugated diene portion is 15-60%, or (ii) an A-B-C block copolymer, in which A and B are as defined above and C is an alkenyl aromatic compound-conjugated diene copolymer tapered block, wherein the proportion of the alkenyl aromatic compound increases gradually, or (iii) an A-B-A block copolymer, in which A and B are as defined above, and wherein in each of the hydrogenated diene block copolymers, the weight proportion of the alkenyl aromatic compound to conjugated diene is from 5/95 to 60/40, the content of the bound alkenyl aromatic compound in at least one block A is at least 3% by weight, the total of the bound alkenyl aromatic compound contents in the two block A's or the block A and the block C is 5% to 25% by weight based on the total monomers, and at least 80% of the double bond unsaturations of the conjugated diene portion is saturated by the hydrogenation.

5. The golf ball of claim 1, wherein the outer cover layer comprises the reaction product of:
   A) at least one component A comprising a monomer, oligomer, or prepolymer, or polymer comprising at least 5% by weight of at least one type of functional group;
   B) at least one component B comprising a monomer, oligomer, prepolymer, or polymer comprising less by weight of anionic functional groups than the weight percentage of anionic functional groups of the at least one component A; and
   C) at least one component C comprising a metal cation, wherein the reaction product comprises a pseudo-crosslinked network of the at least one component A in the presence of the at least one component B.

6. The golf ball of claim 1, wherein the sodium salt of poly(meth)acrylic acid is a sodium salt of poly(acrylic acid).

7. The golf ball of claim 2, wherein the sodium salt of poly(meth)acrylic acid is a sodium salt of poly(acrylic acid).

8. The golf ball of claim 3, wherein the sodium salt of poly(meth)acrylic acid is a sodium salt of poly(acrylic acid).

9. A golf ball comprising;
   1) a core comprising a center,
   2) an outer cover layer; and
   3) one or more intermediate lasers,
wherein at least one of the intermediate layers comprises a blend composition of;
   (A) of from about 75 to about 99 wt % (based on the combined weight of Components A and B) of one or more ionomers; and
   (B) of from about 1 to about 25 wt % (based on the combined weight of Components A and B) of a sodium salt of poly(meth)acrylic acid; and
wherein said blend composition has a flexural modulus of from about 5 to about 500 kpsi, and a Shore D hardness of from about 25 to about 85; and
the outer cover layer comprises a blend composition comprising one or more ionomers blended with;
   A) one or more triblock copolymers; or
   B) one or more hydrogenation products of the triblock copolymers; or
   C) one or more hydrogenated diene block copolymers; and
wherein each triblock copolymer has
   (i) a first polymer block comprising an aromatic vinyl compound,
   (ii) a second polymer block comprising a conjugated diene compound, and wherein each hydrogenated diene block copolymer has a polystyrene-reduced number-average molecular weight of from 50,000 to 600,000, and is a hydrogenation product of;
   (i) an A-B block copolymer, in which A is an alkenyl aromatic compound polymer block, and B is either
      (1) a conjugated diene homopolymer block, wherein the vinyl content of the conjugated diene portion is more than 60%, or
      (2) an alkenyl aromatic compound-conjugated diene random copolymer block wherein the vinyl content of the conjugated diene portion is 15-60%, or
   (ii) an A-B-C block copolymer, in which A and B are as defined above and C is an alkenyl aromatic compound-conjugated diene copolymer tapered block, wherein the proportion of the alkenyl aromatic compound increases gradually, or
   (iii) an A-B-A block copolymer, in which A and B are as defined above, and wherein in each of the hydrogenated diene block copolymers, the weight proportion of the alkenyl aromatic compound to conjugated diene is from 5/95 to 60/40, the content of the bound alkenyl aromatic compound in at least one block A is at least 3% by weight, the total of the bound alkenyl aromatic compound contents in the two block A's or the block A and the block C is 5% to 25% by weight based on the total monomers, and at least 80% of the double bond unsaturations of the conjugated diene portion is saturated by the hydrogenation.

10. The golf ball of claim 9, wherein the sodium salt of poly(meth)acrylic is a sodium salt of poly(acrylic acid).

11. A golf ball comprising;
   1) a core comprising a center,
   2) an outer cover layer; and
   3) one or more intermediate layers,
wherein at least one of the intermediate layers comprises a blend composition of;
   (A) of from about 75 to about 99 wt % (based on the combined weight of Components A and B) of one or more ionomers; and
   (B) of from about 1 to about 25 wt % (based on the combined weight of Components A and B) of a sodium salt of poly(meth)acrylic acid; and
wherein said blend composition has a flexural modulus of from about 5 to about 500 kpsi, and a Shore D hardness of from about 25 to about 85; and
the outer cover layer comprises the reaction product of:
   A) at least one component A comprising a monomer, oligomer, or prepolymer, or polymer comprising at least 5% by weight of at least one type of functional group;
   B) at least one component B comprising a monomer, oligomer, prepolymer, or polymer comprising less by weight of anionic functional groups than the weight percentage of anionic functional groups of the at least one component A; and
   C) at least one component C comprising a metal cation, wherein the reaction product comprises a pseudo-crosslinked network of the at least one component A in the presence of the at least one component B.

12. The golf ball of claim 11, wherein the sodium salt of poly(meth)acrylic acid is a sodium salt of poly(acrylic acid).

* * * * *